INVENTOR.
HOMER C. SIMONS
BY
ATTORNEYS

United States Patent Office 2,808,993
Patented Oct. 8, 1957

2,808,993

HEATER CONTROL

Homer C. Simons, South Euclid, Ohio, assignor to Eaton Manufacturing Company, Cleveland, Ohio, a corporation of Ohio Application June 16, 1955, Serial No. 515,865

8 Claims. (Cl. 237—2)

This invention relates to a control apparatus and more particularly to an electro-mechanical apparatus adaptable for controlling performance of an automobile heater system according to a pre-selected control setting.

Broadly this invention comprehends the provision of various temperature responsive and manually manipulable control elements being operable to automatically provide for activation of a heater core, admittance of fresh or recirculated air through the heater core and to selectively provide heated air for defrosting.

In this invention a single control knob is provided, having a first degree of freedom for adjusting an electrical circuit portion and a second degree of freedom of movement for adjusting a mechanical linkage portion of the invention for controlling the performance of the apparatus as desired. The electrical adjustment in one instance is effective adjustably to vary the flow of water through the heater core while simultaneously positioning a damper for recirculating of air and in another instance is effective to adjustably vary the flow of water through the heater core while simultaneously positioning the damper for admittance of fresh air for heating thereof. The mechanical linkage is effective to operate a damper to selectively provide defrosting air and simultaneously provide electrical energization to a blower motor for high-speed operation. In addition, a thermal switch is provided for automatically deenergizing the blower motor from low-speed operation and an air pressure switch is responsive to air movement through the heater core to deenergize the blower motor. The latter switch is generally operative at higher automobile speeds when the volume of flow of air is heavy due to impact.

It is an object of this invention to provide a simple, inexpensive and effective automobile heater control apparatus.

It is a further object of this invention to provide a heater control apparatus that automatically provides blower operation in response to sufficient temperature rise of a heater core.

It is a still further object of this invention to provide a heater control apparatus that automatically deenergizes a blower motor in response to sufficient air admitted to a ventilation duct due to automobile movement.

Other and further objects and advantages will appear from the following detailed description when considered with the accompanying drawing in which.

Figures 1, 2, 3, 4:
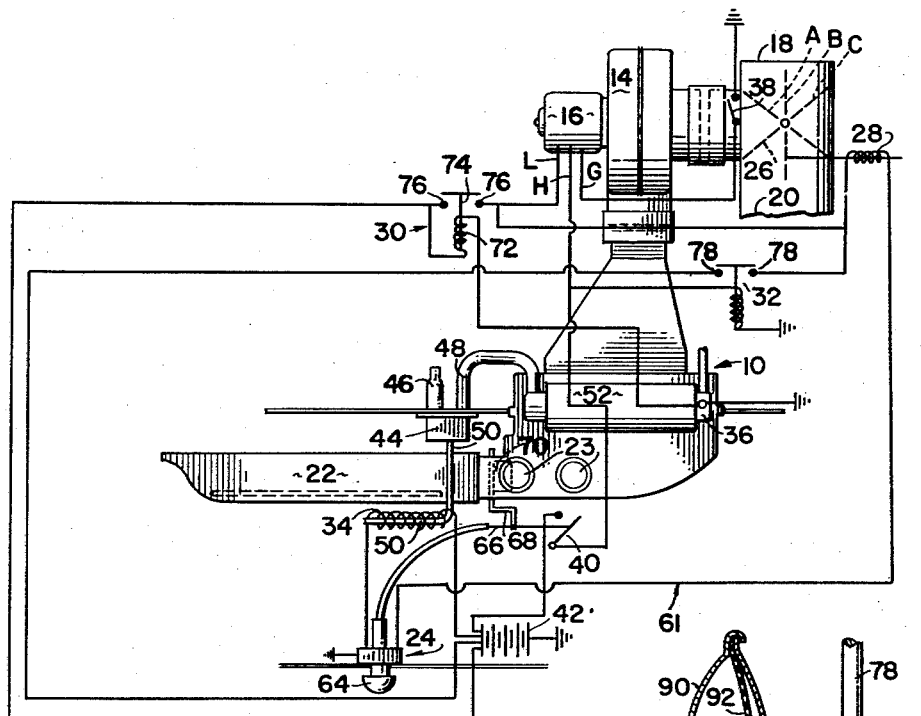
Fig. 1 shows the control apparatus as applied to an automobile heater system.
Fig. 2 shows in detail a portion of the apparatus shown in Fig. 1.
Fig. 3 shows a modification of the portion shown in Fig. 2.
Fig. 4 shows in detail the rheostat and knob control portion of the invention.

Referring now more particularly to Fig. 1 of the drawing 10 represents generally an automobile heater, 14 a blower driven by a motor 16, 18 a fresh air inlet duct, 20 a recirculating air inlet duct, 22 a plenum from which heated air is discharged and 23 a pair of defroster discharge ducts. A rheostat device 24 is provided for making appropriate adjustments for heat, air selection or defrosting as made clear hereinbelow.

A damper 26 mounted on a pivot is provided at the junction of the inlet ducts 18 and 20 in response to the influence of a damper control solenoid 28 for selecting either fresh or recirculating air. Three positions, A, B and C of the damper are shown to represent positions for recirculating air through the blower, fresh air into the automobile and for fresh air into the blower, respectively.

The electrical circuitry of the present invention comprises in addition to damper control solenoid 28 and rheostat 24, a blower relay 30, a fresh air defrosting damper control relay 32, resistance wire 34, thermo switch 36, air operated switch 38 at the blower input, push button switch 40 and battery 42 having one terminal grounded. A gas filled thermo water valve 44 having an inlet tube 46, an outlet tube 48 and a capillary tube 50 having the wire 34 wound therearound is provided for controlling the water flow through a heater core 52.

As shown more clearly in Fig. 4, rheostat 24 is provided with a terminal strip 54 and a pair of arcuate resistance wires 56 and 58, each having one end connected to strip 54. An arcuate contact terminal 60 is provided radially inwardly of wire 58. Wire 56 in one instance and wire 58 and terminal 60 in a second instance are adapted to be contacted by a grounded pivotal conducting arm 62. Conductive connection is made through lead 61 from terminal 60 to one terminal of solenoid 28 for a purpose to be described.

Resistance wire 34 is connected at one end to terminal 54 and at the other end to one terminal of battery 42 to provide a closed circuit through battery 42, wire 34, terminal 54 and ground. Varying degrees of resistance may be interposed in this series path by the adjustment of arm 62 to provide contact with either of wires 56 or 58 at points removed from terminal 54 for a purpose to be described.

A knob 64 on rheostat 24 is mechanically connected to arm 62 for rotation thereof and is also connected to one end of the inner wire 66 of a Bowden wire arrangement with the other end of wire 66 connected to a damper door arm 68 for actuating a damper door 70. Wire 66 is also connected for actuating switch 40 for controlling high-speed energization of motor 16.

Relay 30 is provided with a solenoid 72, armature 74 and a pair of contact points 76. Solenoid 72 is connected at one end to the ungrounded terminal of battery 42 and at the other end to a first terminal of thermo switch 36, the other terminal of switch 36 being grounded. It is noted that upon closing of thermo switch 36 in response to sufficient heat from core 52 a closed path is provided from battery 42 through solenoid 72, through thermo switch 36 and ground to energize solenoid 72 and close contacts 76 by way of armature 74.

The energization of damper control solenoid 28 is accomplished through either the closure of relay 30 with the simultaneous contact between arm 62 and terminal 60 or the closure of switch 40 and the simultaneous contact between arm 62 and terminal 60. In the second instance solenoid 28 is energized through a pair of closed contacts 78 of relay 32 since a solenoid of the relay is energized by the closure of switch 40.

The operation of damper 26 is more clearly understood from a consideration of Fig. 2 wherein the damper 26 and actuating mechanism therefor are shown in detail. Damper 26 is pivotally mounted on and rotatable with a pair of opposed arms 69 and 78. A coil spring 84 having one end attached to arm 78 is provided for urging damper 26 into position A and a manually actuable Bowden wire 80 attached to arm 69 is provided for movement of damper 26 from position A to position B when not under the influence of solenoid 28. The connection of arm 69 to damper 26 allows further rotation of the damper away from position A but not toward position A when deflection of the damper is already made by wire 80.

A solenoid core 82 having an arm 83 connected thereto and which arm is in turn attached to arm 78 is provided for urging movement of damper 26 into position C in response to energization of solenoid 28.

It is assumed that wire 80 is positioned to allow movement of damper 26 into position A and that the heater is in "off" position. If warm recirculated air is desired, knob 64 is rotated in a counter-clockwise direction to an extent according to the amount of heat desired. The effect of rotation of knob 64 is to interpose added resistance in the circuit of resistance wire 34 to decrease the heating effect thereof and to consequently activate thermo water valve 44 by way of capillary tube 50. Valve 44 opens to permit flow of water preferably from the engine cooling system through a suitable tap thereto, which is in communication with inlet tube 46, to the outlet tube 48 which is connected with heater core 52 and thereby effects a heating of core 52. After sufficient heating of core 52 thermo switch 36 closes to provide a ground for one end of solenoid 72 to complete the circuit of energization of the same and provide conduction between contacts 72 to energize blower motor 16. Since damper control solenoid 28 is deenergized, spring 84 is effective to urge damper 26 into position A. Accordingly, recirculated air entering blower 14 from duct 20 passes through heater core 52 and into plenum 22 or through the defroster ducts 23 according to the position of damper 70.

Damper 70 is located in the duct providing communication between the main body of the heater and the plenum 22 is manipulable to be positioned in the duct to either permit the free flow of air from the heater into plenum 22 or to inhibit any such flow of air to thereby cause the air to be discharged through defroster ducts 23. In the event defrosting is desired, knob 64 is manipulated to close damper 70 and to simultaneously close switch 40 to energize motor 16 for high-speed operation.

It is next assumed that it is desired to provide heated fresh air. Knob 64 is rotated in a clockwise direction whereby conductive contact is made between arm 62, terminal 60 and wire 58. As in the case of heating with recirculating air, addiitonal resistance of wire 58 is provided in circuit with wire 34 and valve 44 is again actuated to provide heating for core 52 and motor 14 as described above. In addition a ground connection is provided for damper control solenoid 28 by conduction through terminal 60 and arm 62 to energize the solenoid. Core 82 is drawn into the solenoid and arm 78 is rotated to urge damper 26 into position C. Now fresh air enters duct 18 and passes through blower 14, through core 52 and into plenum 22 or ducts 23 depending on the position of damper 70. Plenum 22 is, of course, operative to distribute the heated air into the automobile in a customary manner. As with recirculated air, closure of damper 70 simultaneously effects a closure of switch 40 to energize motor 16 for high-speed operation.

It is noted that with sufficient air pressure engendered by fast movement of the automobile, and with damper 26 in position C, switch 38 is forced to open to deenergize motor 16. This is desirable since operation of the blower is unnecessary when sufficient air movement is obtained without it.

According to a modification as shown in Fig. 3, damper 26 is operated by vacuum power. A vacuum chamber 90 is provided having as one wall thereof a diaphragm 92 connected at a mid point to an arm 94 engaging arm 72. Within chamber 90 is a coil spring 96 urging diaphragm 92 in an outward direction. Communication between chamber 90 and a source of vacuum (not shown) is provided by way of a conduit 98. A suitable valve assembly is provided for controlling communication between chamber 90 and the vacuum source and comprises a solenoid 100 having a pair of terminals which may be connected in the circuit in the manner of terminals of solenoid 28 and a slidable "needle" 102 interposable across conduit 98.

When the modification of Fig. 3 is employed in lieu of the damper control solenoid 28 a continuous source of vacuum is connected to conduit 98, the terminals of solenoid 100 are connected as the terminal of solenoid 28 and arm 94 is connected to arm 72. In response to energization of solenoid 100, needle 102 is withdrawn from conduit 98 providing communication between chamber 90 and the vacuum source. Accordingly, diaphragm 92 and arm 94 are urged to move damper into position C for admission of fresh air into blower 14.

It is apparent that according to the modification shown in Fig. 3 considerable motivating force for damper 26 may be obtained with a relatively small electrical solenoid. This obviously affords the advantage of low drain from a battery.

While this invention has been described with respect to certain specific embodiments it is apparent to those skilled in the art to which it appertains that it is susceptible of many modifications and variations without departing from the spirit or scope thereof. It is accordingly intended to cover all such modifications and variations in the appended claims.

What I claim is:

1. In combination with an air inlet duct, a motor driven air blower, a heater core, a plenum and air ducts interconnecting the same in the sequence named, a control system comprising a source of electrical potential and a valve being heat responsive and adapted to control the flow of heating fluid in said core, a switch adapted to close in response to sufficient heat of said core, a heating element, a manually adjustable rheostat in circuit with said heating element and said source of potential for adjusting the heating of said heating element and consequently adjusting the flow permitted by said valve, circuit means including said switch for energizing said motor, in response to sufficient heat from said core, and means responsive to adjustment of said rheostat for controlling the flow of air in said inlet duct, whereby the heating and flow of air into said plenum is automatically controlled in response to an initial manual adjustment of said rheostat.

2. In combination with an automobile heating system having an air inlet duct for receiving fresh or recirculated air, a motor driven blower, a heater having a core adapted to be heated by a circulating fluid, a plenum adapted to discharge heated air and ducts providing air communication between the same in the sequence named, a control system comprising a damper in said inlet duct selectively providing for reception of fresh or recirculated air therein, a heating element and a valve for controlling the flow of fluid through said core responsive to said heating element, a rheostat in circuit with said heating element for controlling the temperature thereof, a source of potential having one terminal grounded and another terminal connected to a terminal of said motor, a switch adapted to be closed by temperature rises of said core and being connected between ground and another terminal of said motor to provide energization of said motor in response to closure of said switch, said damper being controlled by manipulation of said rheostat to selectively provide fresh and recirculated air to said heater core.

3. In combination with an automobile heating system having an air inlet duct for receiving fresh or recirculated air, a motor driven blower, a heater having a core adapted to be heated by a circulating fluid, a plenum adapted to discharge air and ducts providing air communication between the named components in the sequence mentioned, a heat responsive valve for controlling the flow of fluid through said core, a heating element located proximately to a portion of said valve for varying the temperature thereof, a rheostat and a source of electrical energy in a closed circuit with said heating element for adjusting the heating thereof and of said portion of said valve for controlling the flow of fluid through said core, a damper for selecting fresh or recirculated air for said inlet duct and means including said electrical source adjustable by said rheostat for adjusting said damper, whereby an automatic control of said heating system is provided in response to an adjustment of said rheostat.

4. In combination with an automobile heating system having an air inlet duct for receiving fresh or recirculated air, a motor driven blower, a heater having a core adapted to be heated by a circulating fluid, a plenum adapted to discharge heated air and ducts providing air communication between the named components in the sequence mentioned, a heat responsive switch located near said core and adapted to close in response to increase in temperature, said switch being in circuit with said motor and a source of electrical energy to provide energization of said motor in response to closure of said switch, a heat responsive valve for controlling the flow of heating fluid through said core, a heating element located near a portion of said valve for varying the temperature thereof, a rheostat in circuit with said electrical source and with said heating element for providing controlled heating of said element to consequently control the flow of fluid through said core, a damper for selecting fresh or recirculated air for said inlet duct and means including a solenoid and said electrical source adjustable by said rheostat for positioning said damper, whereby an automatic control of said heating system is provided in response to an adjustment of said rheostat.

5. In a combination according to claim 4 further comprising a second damper located in the duct between said heater and said plenum, a defroster vent for discharging air passing through said core, switch means adapted for providing increased energization of said motor for high-speed operation and a linkage from said rheostat to said second damper and said last mentioned switch means for simultaneously closing and opening each thereof.

6. In a combination according to claim 4 further comprising a return circuit for said motor, a second switch interposed in said ground circuit and located in said inlet duct, said switch being responsive to sufficient intensity of air flow therethrough to open and deenergize said motor.

7. In a combination according to claim 4 further comprising a vacuum chamber having a diaphragm forming one wall thereof, a needle valve controlling communication to said vacuum chamber, said valve forming a core for said solenoid and being responsive to energization of said solenoid to retract and provide communication between said chamber and a source of vacuum.

8. In combination with an automobile heating system having an air inlet duct for receiving fresh or recirculated air, a motor driven blower, a heater having a core adapted to be heated by a circulating fluid, a plurality of openings in said heater adapted to discharge air therefrom, air ducts providing communication between the named components in the sequence mentioned, a heat responsive valve for controlling the flow of fluid through said core, a heating element located proximately to a portion of said valve for varying the temperature thereof, a rheostat and a source of electrical energy in a closed circuit with said heating element for adjusting the heating thereof and of said portion of said valve for controlling the flow of fluid through said core, a damper for selecting fresh or recirculated air for said inlet duct and means including said electrical source adjustable by said rheostat for adjusting said damper, whereby an automatic control of said heating system is provided in response to an adjustment of said rheostat.

References Cited in the file of this patent
UNITED STATES PATENTS

| | | |
|---|---|---|
| 2,019,991 | Nilson | Nov. 5, 1935 |
| 2,154,523 | Midyette | Apr. 18, 1939 |